June 6, 1967  G. LEE  3,323,654
RUN BACK BAFFLES FOR TRAVELLING FILTERS
Filed Aug. 4, 1965
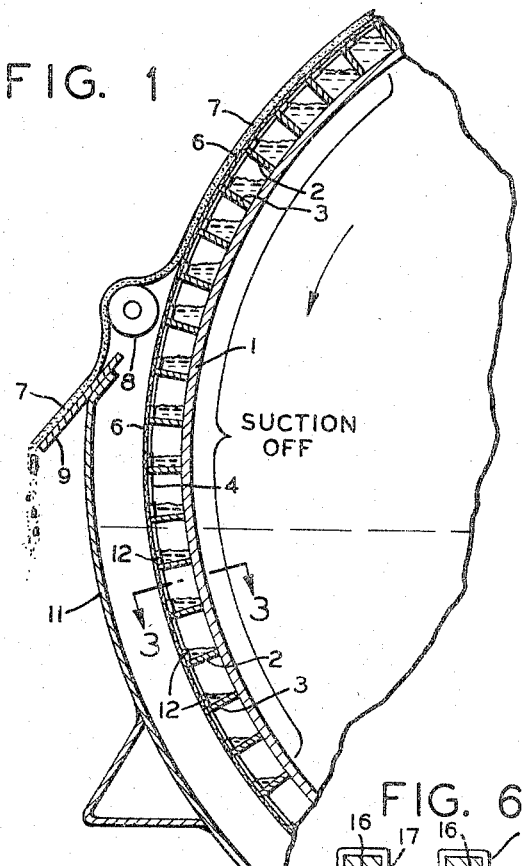
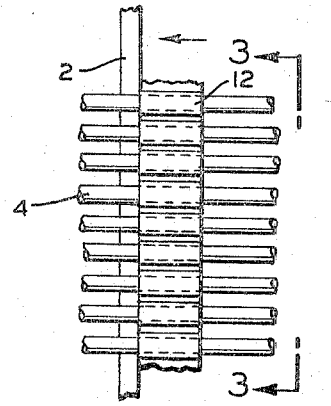
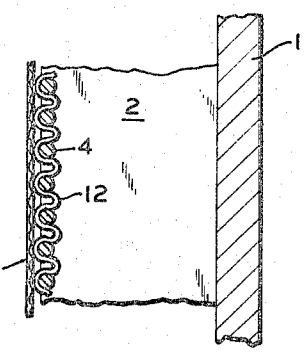
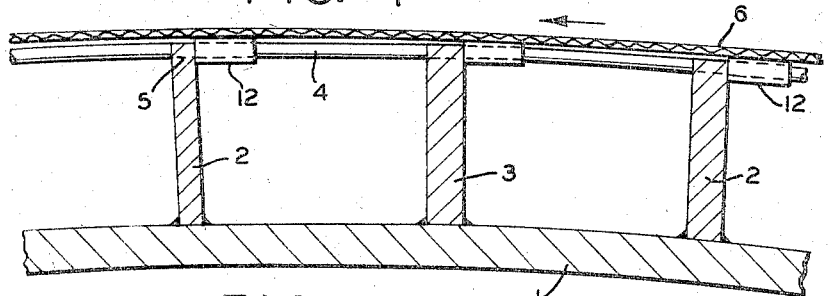
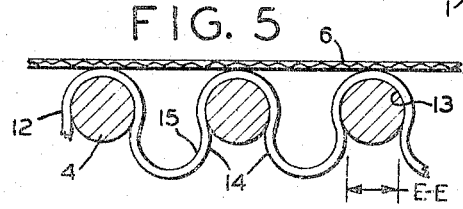
INVENTOR.
GRAHAM LEE
BY George S. Hastings
ATTORNEY.

_United States Patent Office_

3,323,654
Patented June 6, 1967

3,323,654
RUN BACK BAFFLES FOR TRAVELLING FILTERS
Graham Lee, Stamford, Conn., assignor to Dorr-Oliver Incorporated, Stamford, Conn., a corporation of Delaware
Filed Aug. 4, 1965, Ser. No. 477,140
9 Claims. (Cl. 210—404)

This invention relates to continuous filtering apparatus of the general type disclosed in U.S. Patent 919,628 wherein a rotary vacuum or suction drum is partially immersed in a liquid to be filtered. In this type of filter the drum is provided with a number of radially extending division and support strips spaced around the periphery of the drum and commonly over these strips there is provided a winding or grid of spaced wires such as disclosed in U.S. Patent No. 2,472,558 providing the deck for supporting a cloth or other filter medium which is wrapped around the drum over the wires.

In the operation of such filter drum, vacuum is cut off at a cake discharge position at which the drum surface is more or less vertical to facilitate the cake discharge. At and above this position the filtrate liquid on the division and support strips caught between the drum, the filter medium and the strips tends to run off the strips through the filter medium into the filter cake decreasing the efficiency of the filter and the dryness of the cake, and equally or more important, losing valuable dissolved chemicals in the filtrate liquid which runs into the cake. This loss can amount to more than the cost of the filter in a year when the filter is used for pulp washing in which the filtered liquids contain recoverable pulp treating salts.

It is an object of the invention to provide baffle means adjacent the division and support strips at the supporting wire of the filter which will prevent run back of liquid into the cake near or at the discharge position.

A further object is to provide such a run back baffle which can be easily and inexpensively attached to many wire wound or wire grid filters of this general type now in operation.

Still another object is to provide such a baffle which will not blind or interfere with the vacuum to or drainage from the filter medium at the position of the baffle.

Another object is to provide such a baffle which will be attached securely to the wire deck in such a manner that there is no danger of detachment and possible injury to the filter medium.

To these ends the present invention includes the provision of a snap-on baffle which resiliently grips the wires of the filter deck and which provides grooves permitting drainage and access of vacuum adjacent the filter medium.

Additional objects and advantages of the invention will be apparent from the following description of the improved run back baffle as applied to a filter drum as illustrated by way of example in the accompanying drawings, in which:

FIG. 1 is a general cross-sectional view of the discharge portion of the drum and of the baffles at such portion.

FIG. 2 is a detailed top view looking at the deck of the drum toward the center thereof.

FIG. 3 is a cross-section on the line 3—3 showing the baffle applied to the wires of the drum deck.

FIG. 4 is a large cross-sectional view of drum spaces and wire deck with baffles applied as shown in FIG. 1.

FIG. 5 is an enlarged cross-sectional detail of the deck wires with baffle applied showing the manner in which the baffle grips the wires.

FIG. 6 is an enlarged cross-sectional detail showing a modification of the invention applicable to D cross-section deck wires.

Referring now to FIG. 1 of the drawings, the drum 1 is provided with radially projecting division strips 2 providing vacuum compartments about the periphery of the drum and a wire wound or wire grid deck 4 located in grooves 5 of the strips supporting a filter medium 6 wrapped around the drum over said wire deck. Support strips 3 act to support the wire between division strips. The portion of the drum 1 shown is at discharge position with its surface in a generally vertical position at which suction in the drum is turned off by suitable valve means such as disclosed in Patent 919,628 above referred to. The filter cake 7 is discharged by discharge roll 8 onto chute 9 positioned on and above the liquid holding vat 11 in which the filter drum rotates.

The run back baffles 12, as shown in FIG. 1 and more in detail in FIG. 4, are abutted against the division strips 2 and support strips 3 about the grooves 5.

These baffles preferably consist of resilient sheet material such as resilient metal bent into a corrugated form in which each corrugation groove 13 has in cross-section a shape somewhat similar to the Greek letter omega in which the wire gripping faces of the corrugations are reentrant, that is bent inwardly towards each other at the open side of the groove. I have found stainless steel ½ inch wide and 10 thousandths of an inch thick suitable for this purpose though the thickness may vary considerably and other materials may be used.

As shown in FIG. 5 the gripping faces 14 of the grooves 13 of the corrugations have a depth from the bottom or closed side of the groove greater than half the diameter of the round wires 4, the grooves having a cross-sectional opening at E—E less than the diameter of the wires to partially surround and positively grip the wires.

It will be noted that the internal grooves of the corrugated material snugly fit the wires. Due to the inwardly curved faces 14 at the opening side of the grooves of the corrugations the opening of the groove has width less than the diameter of the wires and at a distance more than the radius of the wire in distance from the bottom or closed side of the grooves, whereby the wires are positively gripped and the baffle strip is held against the wires. This is important because if a portion of the baffle is separated from the wires, it might present an edge which could tear the filter medium.

It will be noted that the configuration of the corrugated baffle is such that there is a groove 15 between the filter medium and the portion of the baffle between wires which is closed by the division or support strip at one end to prevent run back but open at the other end. This provides an ample access channel to effect suction on the filter medium and also to permit liquids to drain from the filter medium. The importance of this lies in the fact that a flat baffle surface on which the filter medium rests would result in a significant portion of the filter medium being blinded, that is rendered ineffective to suction and filtering, and would render the cake weaker hindering effective discharge by roll 8.

Because of the resilient nature of this baffle and the configuration thereof such that it partially surrounds and snugly grips the wires, the baffle can be snapped on and off the wires. This baffle is readily applicable to the large number of wire deck filters already in the field. Moreover, it is readily detached for cleaning or repair of the filter.

As shown in FIG. 6, the baffle 12a is applicable to D cross-section wires, that is wires having a flat top 16 which engages the filter medium and flat sides 17 and 18 and a rounded bottom 19 and having a greater depth from top to bottom than the distance between the flat sides. In this form the corrugations or grooves 10a in the resilient sheet metal transversely corrugated baffle 12a is shaped as shown to have flattened side walls and bottom snugly fit the D cross-section wires. These grooves 10a also have re-entrant curves toward each other at a position EE below the position of greatest width of the wire. This results in positively holding the baffle in place, yet permitting it because of its resilience to be snapped on and off the wires.

In the operation of this run back baffle, the baffle is laid over the wires and pressed into a snug snap fit on the wires 4 with the edge of the baffle abutting the trailing side of the spacing strip as shown in FIG. 1 and following closely the wall of the groove 5 of the strips 2 and 3. To remove the baffle, the loops are simply pushed outwardly to unsnap the resilient baffle from the wires.

The cross-sectional contour of the corrugated baffle strip and of grooves 5 are such that the baffle conforms to the grooves as well as the wires at the position where it abuts against the strips 2 and 3, thus avoiding leakage at this location.

The baffle strip need not necessarily extend the entire width of the drum since in some types of filters much of the run back usually occurs at the division or support strips from 2 to 4 feet from the end of the drum.

It is understood that changes can be made in the construction and arrangement of this run back baffle as hereinbefore described without departing from the scope of the present invention, which is set forth in the appended claims.

I claim:

1. In a rotary drum vacuum filter having a generally vertical sector for discharge of filter cake, the combination with a vacuum drum having a series of radially projecting strips at the periphery of said drum extending generally parallel to the axis of said drum to provide a series of vacuum chambers about the periphery of the drum, the combination with a filter medium supporting grid of axially spaced wires extending circumferentially about the drum over said strips, an elongated baffle strip narrower than the distance between strips constructed of sheet material and having grooves therein corresponding to the spacing of said wires and said grooves being of a width and contour to snugly grip the wires, for attaching said baffle to said wires with its length extending generally parallel to the axis of the drum at a position abutting said division or drainage strips on the trailing side thereof and substantially in the plane of the medium supporting surface of said wires to prevent run back of filtered liquid from said division strips into filter cake on said medium at said discharge sector.

2. The invention according to claim 1 in which said baffle is provided with at least one groove open toward the filter medium between each wire gripping groove to provide for drainage and access to said vacuum chambers.

3. The invention according to claim 1 in which said baffle comprises a strip of transversely corrugated resilient sheet material, the corrugations of which provide said grooves and also provide the grooves between wires open toward the filter medium and closed at one end by said strips and open at the other end for drainage and access to vacuum.

4. The invention according to claim 1 in which the wires in cross-section have a top surface for engaging the medium and have flat radially extending sides and has a depth in a radial direction substantially greater than that of their width between said sides, said sheet material being resilient and said grooves being of a width and shape to snugly fit said sides and to extend partially around the bottom of said wires to a limited degree permitting snapping the baffle on and off said wires.

5. The invention according to claim 1 in which the wires are circular in cross-section and at least a part of the gripping portion of said grooves has a cross-sectional opening of a width less than the diameter of the wires at a distance from the bottom of the groove greater than the radius of the wire so as to partially surround and positively grip said wires.

6. In a rotary drum vacuum filter having a generally vertical discharge portion, the combination with a vacuum drum having a series of radially projecting strips at the periphery of said drum to provide a series of vacuum chambers about the periphery of the drum, the combination with a filter medium supporting grid of axially spaced wires extending circumferentially about said drum over said strips, external grooves in said strips receiving and fitting around said wires, an elongated baffle strip narrower than the distance between strips having grooves therein corresponding to the number of wires of size and shape to snugly fit the wires and conform to said external grooves at a position abutting said strips on the trailing side thereof with the length of said baffle extending generally parallel to the axis of the drum to prevent run back of filtered liquid into the filter cake from the strips at said discharge position.

7. An anti-run back baffle strip for application to the wire of wire deck drum filters, having radially projecting division and support strips under the wire said division strips extending axially and being spaced about the periphery of the filter drum, comprising a narrow elongated transversely grooved strip of material adapted to closely abut a division strip of a width substantially less than the normal circumferential spacing between said division and drainage strips the grooves of which are of a width and shape which will snugly fit the wire, at least a portion of said grooves having a cross-sectional opening less in width than the width of the wires at a distance from the bottom of the groove beyond the position of greatest width of the wire to partially surround and positively grip the wires and secure the baffle strip in division abutting position to prevent runback of filtrate.

8. The invention according to claim 7 in which said material comprises sheet metal having a resilience such that the baffle strip securely snaps on and is capable of being snapped off said wires.

9. An anti-run back baffle for rotary vacuum drum filters of the type having a filter medium supporting deck of circumferential wires and having radial division and supporting strips extending under the wires generally parallel to the axis of the drum, said baffle strip comprising an elongated narrow strip of resilient material adapted to have an edge fit in abutting relationship to said division and support strips, the baffle strip being corrugated transversely to provide inward and outwardly facing transverse grooves therein, the inwardly facing grooves being of a diameter to snugly fit said wires at least a portion of said inward grooves having a cross-sectional opening less in width than the width of the wires at a distance from the bottom of the grooves greater than that of the greatest diameter of the wire to partially surround and positively grip the wires, said outwardly facing grooves being adapted to provide vacuum and drainage channels between said filter medium and baffle strip.

References Cited
UNITED STATES PATENTS

| | | | |
|---|---|---|---|
| 673,425 | 5/1901 | Duncan et al. | 210—396 |
| 2,472,558 | 6/1949 | Ackerly | 210—404 |
| 2,889,931 | 6/1959 | Buttolph | 210—404 |
| 3,150,082 | 9/1964 | Rich | 210—395 |
| 3,175,691 | 3/1965 | Watson | 210—404 |
| 3,225,935 | 12/1965 | Porteous | 210—404 |

REUBEN FRIEDMAN, *Primary Examiner.*

J. ADEE, *Assistant Examiner.*